April 12, 1960
W. C. ASHBY
2,932,377
CARTRIDGE ORIENTING APPARATUS
Filed April 28, 1958
2 Sheets-Sheet 1
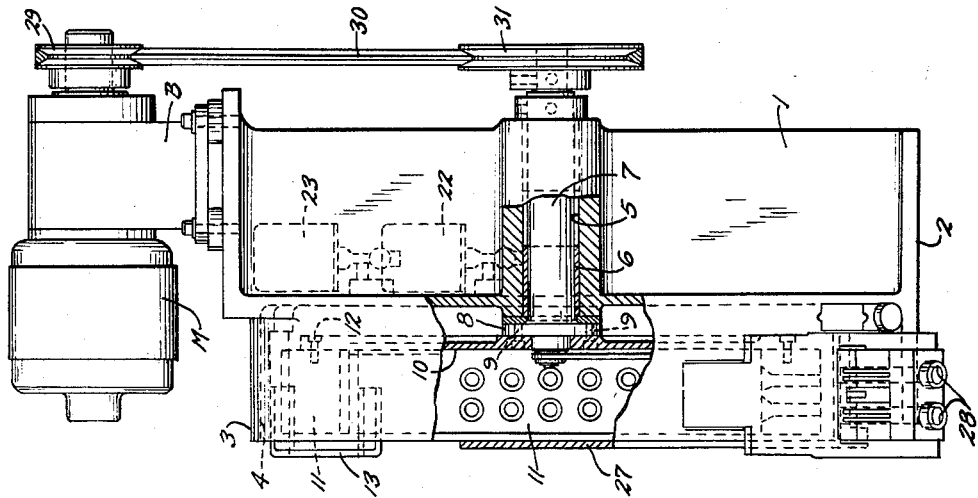
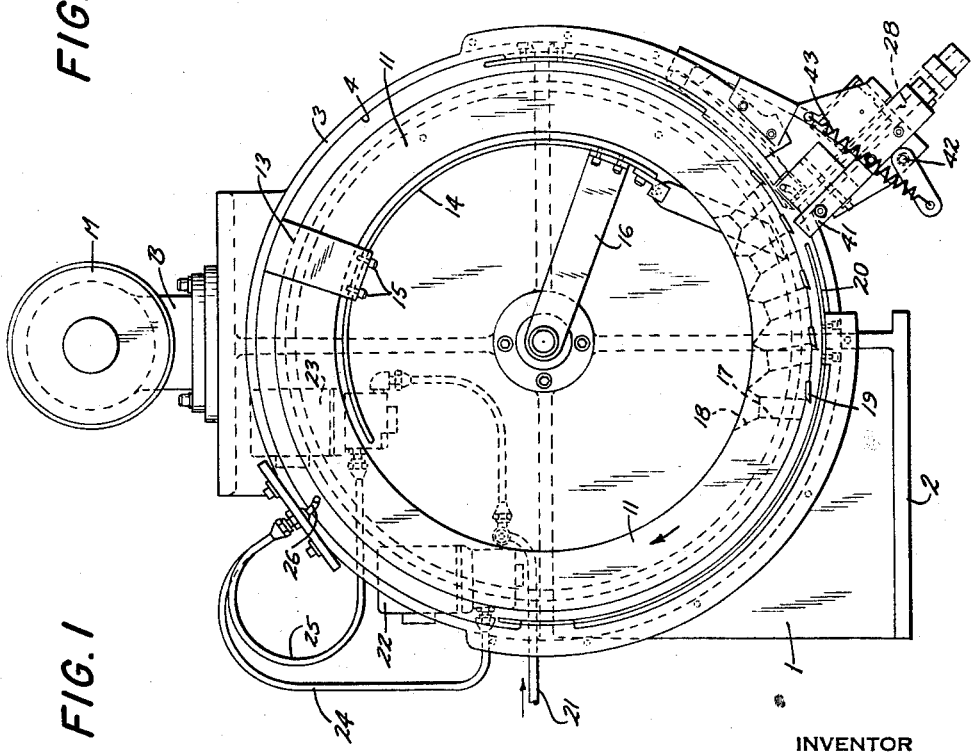
INVENTOR
WILLIAM C. ASHBY
BY April 12, 1960  W. C. ASHBY  2,932,377
CARTRIDGE ORIENTING APPARATUS
Filed April 28, 1958  2 Sheets-Sheet 2

INVENTOR
WILLIAM C. ASHBY

2,932,377
CARTRIDGE ORIENTING APPARATUS

William C. Ashby, Fairfield, Conn., assignor to Remington Arms Company, Inc., Bridgeport, Conn., a corporation of Delaware Application April 28, 1958, Serial No. 731,452

5 Claims. (Cl. 198—33)

This invention relates to the field of small caliber firearm ammunition manufacture. More particularly the invention involves improved apparatus for receiving and orienting cartridge cases for movement to another work location. Heretofore there has been considerable difficulty in obtaining equipment which could handle cartridge cases of the rimmed (lip) and rimless type (grooved) interchangeably.

It is an object of this invention to provide a novel and improved apparatus which will receive a plurality of cartridge cases in random orientation and, by its operation, rapidly and efficiently align them and position them for feeding to the next manufacturing operation.

It is a further object to provide such an apparatus which is simple in construction and is safe and reliable in operation, requiring a minimum of attention during operation and for maintenance purposes.

Other objects and advantages will appear from a consideration of the following specification, claims and the accompanying drawings, in which:

Figure 1 is a front elevation of a machine embodying features of the present invention with the cover plate removed so that the internal arrangement of its structure will be more clearly shown.

Figure 2 is a side elevation of the machine of Figure 1 with the cover plate in place and certain other parts broken away for a clearer showing.

Figure 4:
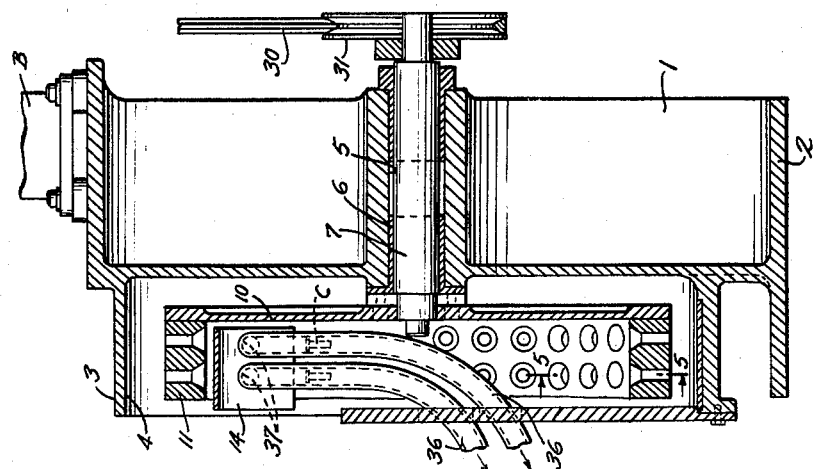
Figure 4 is a vertical transverse section through the modified machine of Figure 3 taken on line 4—4.

The preferred embodiment, the machine of my invention, is shown in Figures 1 and 2. The machine receives groups of cartridge cases after one stage in their manufacture in random alignment and operates upon them to continuously orient or align them and feed them on to the next stage or operation in the manufacturing process.

The machine of Figures 1 and 2 comprises a solid metallic frame structure 1 having a base 2 and a cylindrical portion 3. Cylindrical portion 3 is provided with a cylindrical recess or bore 4. A bore 5 is also provided in frame 1. Journalled in bore 5 on bearing sleeve 6 is a shaft 7 which is provided at one end with rotary drive means consisting of motor as on base B, drive sprocket 29, drive belt 30 and sprocket 31. The other end of shaft 7 is provided with flanged portion 8 bolted by bolts 9 to disk member 10. Secured about the periphery of disk member 10 by bolts 12 is annular transfer wheel member 11. It will be understood that operation of motor M will cause rotation of transfer wheel member 11 in recess 4. Wheel member 11 is provided with two rows of substantially radial passageways 17 passing therethrough. Each passageway is flared as at 18 at its inner end, is provided at its outer end with a transversely positioned knife edge element 19 with a sharp edge extending across the end portion of the passageway as shown in the drawings. The wheel member is mounted for rotation in the cylindrical recess 4 and a cover element 27 partially closes the open end of the recess. Secured to the upper portion of cylindrical frame portion 3 is a bracket 13 which carries a curved guide surface 14 thereon secured by bolts 15. Curved guide 14 extends around a portion of the inside of wheel member 11, as shown, to prevent cartridge cases carried on wheel 11 from falling out of the passageways during the upper portion of wheel travel.

Extending through an upper portion of cylindrical frame portion 3 is an air nozzle 26 which is supplied by pressurized air via air lines 21, 24, 25 and control devices 22 and 23. Air nozzle 26 is positioned so that a jet of pressurized air is directed on the periphery of wheel member 11 along a line substantially tangent thereto during operation of the machine.

Guides 20 extend along a lower portion of the periphery of wheel element 11 and closely adjacent thereto to maintain cartridge cases carried in the wheel passageways in proper position.

A pair of exit passageways 28 intersect the cylindrical portion of the machine at a lower portion thereof and extend to a point adjacent the outer periphery of wheel element 11.

When in operation the wheel element is driven by the motor M in the direction of rotation indicated by the arrow at a speed of about 7 r.p.m. in my preferred embodiment. Groups of randomly aligned or oriented cartridge cases are fed into the machine into the interior of wheel element 11 by hand or by conveyor means not shown. These cartridge cases fall to the bottom of rotating wheel element 11 and are tumbled and agitated thereby its rotation. A number of these cartridge cases will fall into the passageways 17 which are of a size to accommodate them. Due to the flared portion of the passageways 17 and the weight distribution of the cartridge cases, most of them will fall with the closed and rimmed or grooved end downward. The cartridge cases falling into the passageways come to rest against curved guide 20 and are carried around in a clockwise direction by the rotating wheel element. As the cartridge cases move upwardly and around the circular path, those which entered the passageways with their closed and rimmed or ground ends downward will be held in the wheel element by engagement of the knife edge element 19 with the rim or groove on the closed end of the case due to the action of gravity on the cases. Those which entered the passageways with their open ends downward will fall or slide out of the wheel element 11 and rejoin those being tumbled at the interior bottom portion thereof. The cases which are being held in the wheel element by engagement of the knife edge element 19 with the rim or groove thereof are carried to the top of the circular path to a point at which the blast of air from air nozzle 26 strikes them to disengage the rims or grooves from the knife edge elements. These cases then drop inwardly of the wheel 11 but are prevented from leaving the passageways by curved guide 14. These cases are then moved about the circular path of wheel 11 to the point where they can drop through exit passageways 28 and move by gravity to the next station.

Figure 3:
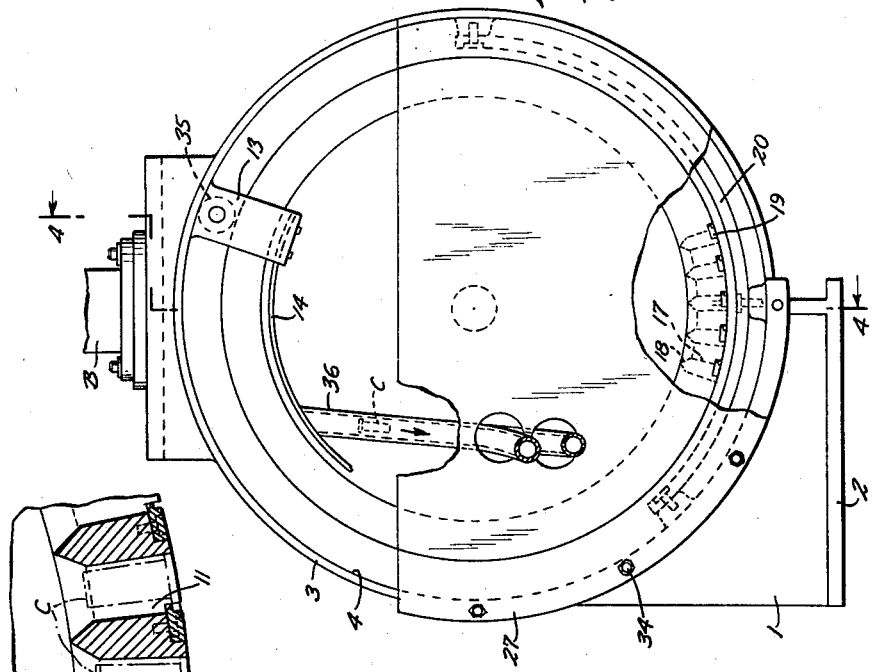
Figure 3 is front elevation of a modified machine embodying features of the present invention with certain parts broken away.
Figure 5:
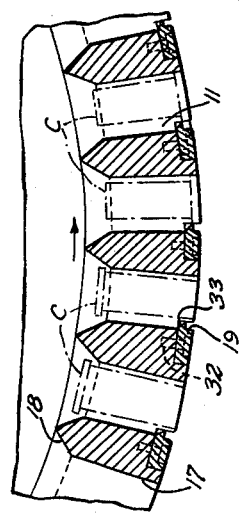
Figure 5 is a sectional view on an enlarged scale of a portion of the main hopper wheel taken on line 5—5 of Figure 4.

The modified machine shown in Figures 3, 4 and 5 is similar to that shown in Figures 1 and 2 except that a rotating brush 35 (Fig. 3) driven from belt 30 in a manner not shown, is substituted for the air blast for disengaging the cartridge case rims or grooves from the knife edge elements. Also, the modified machine reverses the attitude of the cartridge cases leaving the machine by taking them from the wheel element 11 at a different point in its rotating path. Otherwise the operation is the same as that shown in Figures 1 and 2.

The machine of Figures 1 and 2 is provided with a spring-biased pivoted section of the structure containing the exit passageways 28. In the event a cartridge case fails to fall completely from the wheel element 11, such a case will engage pivoted member 41 and move it in a counter clockwise direction about pivot pin 42 against the action of spring 43. This movement will actuate a switch (not shown) in the electrical circuit for motor M to stop the rotation of the wheel and prevent damage to the apparatus.

In accordance with the Patent Statutes I have described in detail a preferred embodiment of my invention and one modification thereof. Further modifications will occur to persons skilled in the art, and all such are considered to fall within the spirit and scope of the invention as defined in the appended claims.

I claim:

1. Apparatus for orienting and feeding ammunition cartridge cases comprising in combination a frame, an endless transfer member movably mounted in said frame, power drive means mounted on said frame and operatively connected to said transfer member for driving the same, said transfer member provided with a plurality of aligned cartridge case receiving chambers for moving a series of cartridge cases from a first to a second position in said machine, securing means mounted in each cartridge case receiving chamber for retaining all cartridge cases of given alignment in the said chambers for movement to a third position during movement of said transfer element in said machine while allowing cartridge cases of any other aligment to move away from said chambers at said second position, means on said frame at said third position for disengaging said cartridge cases from said securing means, and means for directing released cases from the transfer element and the machine.

2. Apparatus for continuously orienting and feeding cartridge cases of the type having firearm extractor engaging means comprising a rim around the closed end thereof and of the type having firearm extractor engaging means comprising a groove around the closed end thereof, comprising in combination a frame, a rotary annular wheel member having a drive shaft secured thereto and rotatably mounted in said frame, power drive means mounted in said frame and operatively connected to said shaft, said wheel member provided with a plurality of circumferentially spaced substantially radially aligned passages therethrough each passage having an inner and an outer end and of a size to accommodate one cartridge case therein, said passages and said wheel member constructed and arranged to continuously carry a series of cartridge cases positioned therein from a first position to a second position, holding means mounted in each passage to engage the firearm extractor engaging means of cartridge cases positioned therein having a given orientation, to retain said cases of said given orientation in said wheel element for movement to a third position while permitting cases on said passages having other than said given orientation to be removed from said wheel member at said second position, means in said frame adjacent said third position releasing said cases of given orientation from said holding means and means at said third position for directing said released cases from said wheel member and the machine.

3. Automatic apparatus for continuously receiving a series of unoriented cartridge cases of the type having a firearm extractor engaging structure, orienting and feeding the same from the apparatus, comprising in combination, a stationary supporting frame, a rotating assembly having a flanged shaft journalled in said frame and an annular element secured thereto for rotation about a substantially horizontal axis within said frame, power drive means operatively connected to said shaft for rotating said assembly, said annular element provided with a plurality of circumferentially spaced substantially radially aligned case-receiving passages therethrough, each passage having an inner end opening on the inner periphery of said annular element and an outer end opening on the outer periphery of said annular element, stationary curved guides mounted on said frame adjacent to and extending in concentric relationship with the inner and outer peripheries of said annular element, fixed closure wall means on said frame cooperating with said rotating annular element to substantially confine a group of unoriented cases within said annular element, said stationary curved guide extending around the inner periphery of said annular element provided with an opening to permit cases of said confined group to fall into said passages in said rotating annular element at a first position and be carried thereby to a second position in its rotation, knife edge elements mounted in each passage to engage the extractor engaging means of all cases carried thereby of a given orientation to prevent withdrawal movement of said cases of given orientation at said second position while permitting withdrawal of all cases with orientation other than the said orientation therefrom at said second position, said stationary curved guides provided with a first passageway therethrough to return cases removed at said second position to said group confined within said rotating annular element, and a second passageway therethrough to direct cases of said given orientation from a third position from the annular element and the machine, and means in said frame adjacent said third position for disengaging said cases from said knife edge element.

4. Apparatus for continuously receiving, orienting, and feeding cartridge cases comprising in combination a frame, a movable conveyor means mounted in said frame, a plurality of cartridge case holding chambers on said conveyor means, power drive means operatively engaged with said conveyor means a first position in which cartridge cases are positioned therein in random orientation to a second position in which the chambers are positioned in an inverted position, first cartridge case engaging means mounted in said chambers to retain all cartridge cases of a given orientation in said chambers and allow all others to move from said chambers when in said second position, a second cartridge case engaging means mounted on said frame at a third position to prevent movement of said oriented cases from said chambers in said conveyor means, a releasing means positioned in said frame adjacent said second cartridge case engaging means for disengaging said oriented cartridge cases from said first cartridge case engaging means, and conduit means cooperating with said second cartridge case engaging means and said releasing means to cause said oriented cartridge cases in said chambers to be directed from said chambers and said machine.

5. A cartridge case orienting and feeding machine comprising a fixed frame, a rotary drum mounted in said frame for rotation about a horizontal axis, a plurality of substantially radially aligned pockets carried by said drum, each pocket of a size to contain a single cartridge case when aligned therewith, a fixed cylindrical housing surrounding the periphery of said drum, end walls for said drum substantially enclosing the same, to contain a plurality of unoriented cases positioned herein, holding means in said pockets for securing cartridge cases of a given orientation therein during a first portion of the drum rotational travel and permitting cases of other than the given orientation to move from their chambers under the force of gravity during said portion of drum travel, release means positioned in said frame adjacent said drum for disengaging said cases having said given orientation from said holding means during a second portion of drum travel, and cartridge guide means in said frame cooperating with said release means to direct and guide said disengaged oriented cartridge cases from said pockets in said drum and from said machine.

References Cited in the file of this patent

UNITED STATES PATENTS

| | | |
|---|---|---|
| 233,062 | Barlow | Oct. 12, 1880 |
| 271,886 | Mason | Feb. 6, 1883 |
| 2,433,561 | Angell | Dec. 30, 1947 |